(12) United States Patent
Machida et al.

(10) Patent No.: US 6,512,604 B1
(45) Date of Patent: Jan. 28, 2003

(54) COLOR IMAGE READING DEVICE

(75) Inventors: Satoshi Machida, Chiba (JP); Yukito Kawahara, Chiba (JP); Masahiro Yokomichi, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/212,755

(22) Filed: Dec. 16, 1998

(30) Foreign Application Priority Data

Dec. 17, 1997 (JP) ............................................. 9-348339

(51) Int. Cl.[7] ................................................. H04N 1/46
(52) U.S. Cl. ........................ 358/513; 358/509; 358/510
(58) Field of Search ................................. 358/474, 494, 358/451, 288, 282, 284, 448, 509, 510

(56) References Cited

U.S. PATENT DOCUMENTS

| | | | | |
|---|---|---|---|---|
| 4,409,625 A | * | 10/1983 | Ogasawa | ..................... 358/288 |
| 4,953,014 A | * | 8/1990 | Iakaragi | ..................... 358/77 |
| 5,019,897 A | * | 5/1991 | Shirata | ..................... 358/75 |
| 5,783,817 A | * | 7/1998 | Goharing | ............... 250/231.14 |
| 6,266,089 B1 | * | 7/2001 | Shimamura | ................. 348/301 |

* cited by examiner

Primary Examiner—Jerome Grant II
Assistant Examiner—Negussie Worku
(74) Attorney, Agent, or Firm—Adams & Wilks

(57) ABSTRACT

The present disclosure relates to a color image reading device that successively switches three color light sources to irradiate the color original copy and successively reads information on the original using a monochrome image sensor, and which is featured by simple construction and less reading time period. A plurality of image sensor ICs are linearly mounted. A start pulse output terminal of an anterior stage image sensor IC is connected to a start pulse input terminal of a posterior stage image sensor IC, thereby forming an image sensor block. A plurality of those image sensor blocks are provided such that start pulse input terminals of initial stage image sensor ICs in all blocks are connected together. By inputting start pulses to the terminals connected together, image signal outputs are read out simultaneously.

6 Claims, 5 Drawing Sheets

COLOR IMAGE READING DEVICE

BACKGROUND OF THE INVENTION

1. Field of the Invention

The present invention relates to a color image reading device that reads information on an original copy to obtain the information as electric signals.

2. Description of the Related Art

A typical color image reading device is disclosed by Japanese Patent Application Laid-open No. Sho 54-81715, which successively switches light sources of three colors (red/green/blue) to irradiate a color original copy, and which successively reads the information on the original copy with a monochrome image sensor. Recent development can permit an LED to be used as each of three color light sources to thereby make the device compact.

FIG. 2 is a plane view showing an example of a monochrome image sensor that is used in a conventional color image reading device. FIG. 3 shows a timing chart of the conventional color image reading device.

In FIG. 2, image sensor ICs 1-1 to 1-9 which have the same construction are linearly mounted on a circuit board 7. Each image sensor IC has a start signal input terminal 3, a start signal output terminal 5, and an image signal output terminal 4, which are electrically connected to a wiring pattern 12 on the circuit board 7 through bonding wires 6. Each image sensor IC is provided with a light receiving element array 2. Although not shown in the drawings, clock pulses and electric power are supplied to the image sensor ICs through the bonding wires 6.

The start signal input terminal 3 of the image sensor IC 1-1 is connected to a start signal input terminal 8 of the circuit board 7. The start signal input terminals 3 of the image sensor IC 1-2 and other succeeding image sensor ICs are respectively connected to the start-signal output terminals 5 of the one-preceding image sensor ICs.

The image sensor IC initiates the output through the image signal output terminal 4 when the image sensor IC receives a start pulse through the start signal input terminal 3. The image sensor IC successively outputs the outputs of the light receiving elements in each-bit basis synchronously with the clock pulses or the like. At near timing to output the last bit of the light receiving element, the image sensor IC outputs a start pulse through the start signal output terminal 5. This start pulse is used as a start pulse for the succeeding image sensor IC. The outputs of the light receiving elements of all image sensor ICs are read out successively in this manner. The image signal output terminals 4 of all image sensor ICs are connected to an image signal output terminal 13 of the circuit board 7, so that electric signals are externally output to be subjected to processing such as A/D conversion.

The image sensor IC initializes a light receiving element immediately after the output from that light receiving element is ended, and thereafter starts charging the carriers generated by the next photo-electric conversion. Therefore, a conventional color image sensor, in which the image sensor as shown in FIG. 2 is used to read a color image, performs the irradiation by the three color light sources and the output of those colors in such a timing as shown in FIG. 3. That is, immediately after the output in each bit is ended, the charge for that bit is started, so that the image signal cannot be output during the light source is ON. For this reason, the sum of the time period for the irradiation of three colors and the time period for the output of three color image signals is required to read information of three colors on one line. Thus, there arises a problem in that the reading time per one line is long.

The detailed description will be given with reference to FIG. 3. Immediately after the RED light source is set to be OFF, the start pulse is entered through the start signal input terminal 8 of the circuit board 7 to the image sensor IC 1-1, and thereafter the image signal outputs of RED component from the light receiving element are started. After the outputs of all image sensor ICs are ended, the Green light source is set to be ON, so that all light receiving elements charge carriers generated due to the reflected light from the original copy irradiated by GREEN light source. Here, if the GREEN light source is set to be ON before the image signal outputs of RED components from all image sensor ICs are ended, the outputs which have not yet been output from the image sensor ICs are inevitably mixed with the component of the GREEN reflected light. Therefore, this is not acceptable case. When the start pulse is entered through the start signal input terminal 8 of the circuit board 7 to the image sensor IC 1-1 immediately after the GREEN light source is set to be OFF, the image signal output of GREEN component from the light receiving element is started. The similar procedure is carried out with respect to BLUE. Thus, the reading time period T for one line is expressed by the following formula:

$$T = TP(R) + TP(G) + TP(B) + 3 \times C \times B \times TY$$

Here, TP(R), TP(G) and TP(B) respectively indicate the time period when the RED light source is ON, the time period when the GREEN light source is ON and the time period when the BLUE light source is ON. The character C designates the number of image sensor ICs; B, the number of light receiving elements in one image sensor IC; and TY, the reading time period per one bit.

For example, in case of an image sensor having a width of A4 sheet size and 300 DPI resolution, if the number of light receiving elements is 288 (B=288), then the number of image sensor ICs is 9 (C=9), and further if the reading time period per one bit is 500 nsec (TY=500 nsec), then the image signal output time period for one line is 3.888 msec (3×C× B×TY=3.888 msec).

Assuming that each of TP(R) TP(G) and TP(B) is 1 msec (TP(R)=TP(G)=TP (B)=1 msec), the time period when light sources are ON is 3 msec (TP(R)+TP(G)+TP(B)=3 msec).

Therefore, the total reading time period T is about 6.888 msec (T=6.888 msec), so that the image signal output time period occupies 56% of the reading time period for one line.

Such an IC is available, in which memory means each having capacity corresponding to each bit are provided within the IC so that the output of each bit is temporality input into the memory means and thereafter read out from the memory means in order. In this case, since the light can be emitted from the light source of the next color during the output time period, the reading time period per one line is substantially equal to the total irradiation time period of three color light sources. However, there arises a problem in that the provision of the memory means within the IC results in the increase in the cost of the image sensor IC.

The irradiation time period of the light source depends on luminance of the light source and the S/N ratio of the image sensor, and thus can not be readily shortened. Further, the output time period depends on the activation speed of the IC, and thus it is hardly shortened.

SUMMARY OF THE INVENTION

In order to solve these problems associated with the conventional art, the present invention provides a color image reading device that can shorten the reading time period, and can be manufactured with low cost.

In order to solve the above-mentioned problems, the present invention provides a color image reading device having the following arrangement.

In a color image reading device having three or more color light sources and an image sensor mounting a plurality of image sensor ICs linearly thereon, the image sensor ICs are divided into two or more blocks, and image signal outputs of all blocks are read out simultaneously.

In a case where the image sensor ICs are divided into N blocks so that image output signals of all blocks are read out simultaneously, the image signal output time period for one line can be reduced to be about 1/N of that in the conventional device. Therefore, a color image reading device featured by simple construction and less reading time period can be obtained.

BRIEF DESCRIPTION OF THE DRAWINGS

In the accompanying drawings.

DETAILED DESCRIPTION OF THE PREFERRED EMBODIMENT

Figure 1:
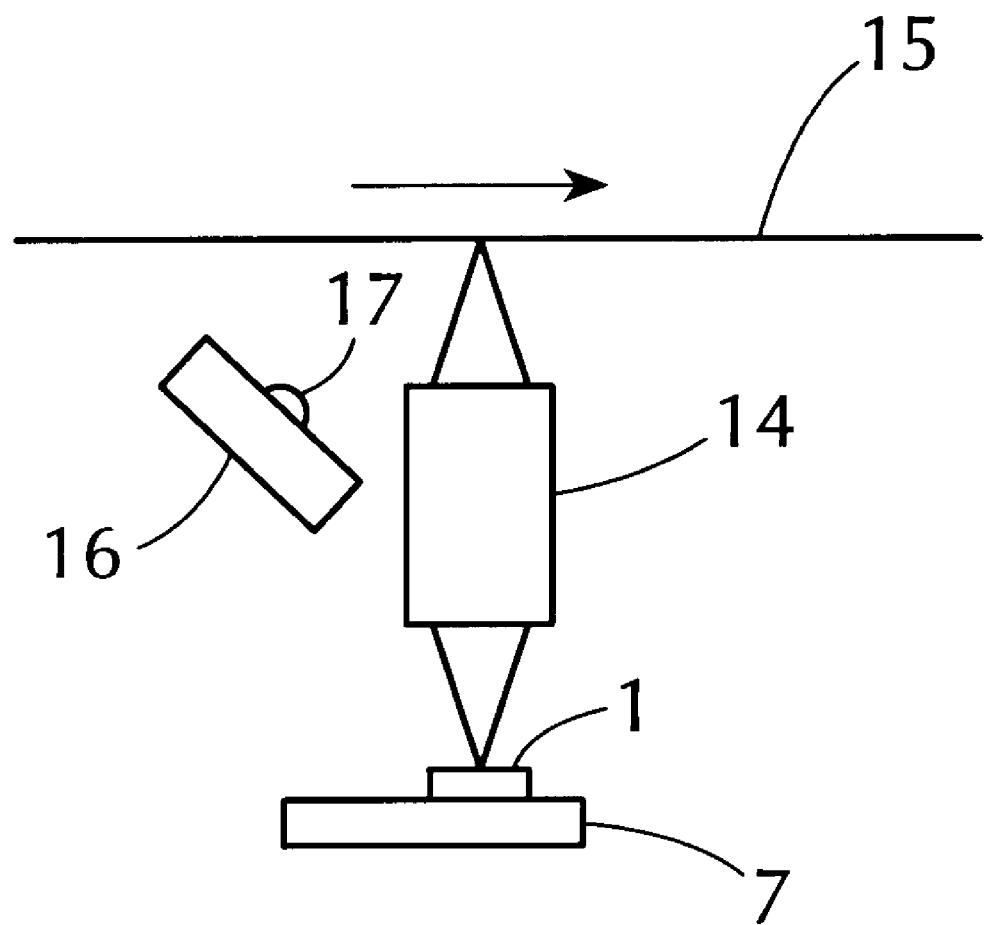
FIG. 1 is a sectional view showing a color image reading device according to the present invention.
Figure 2:
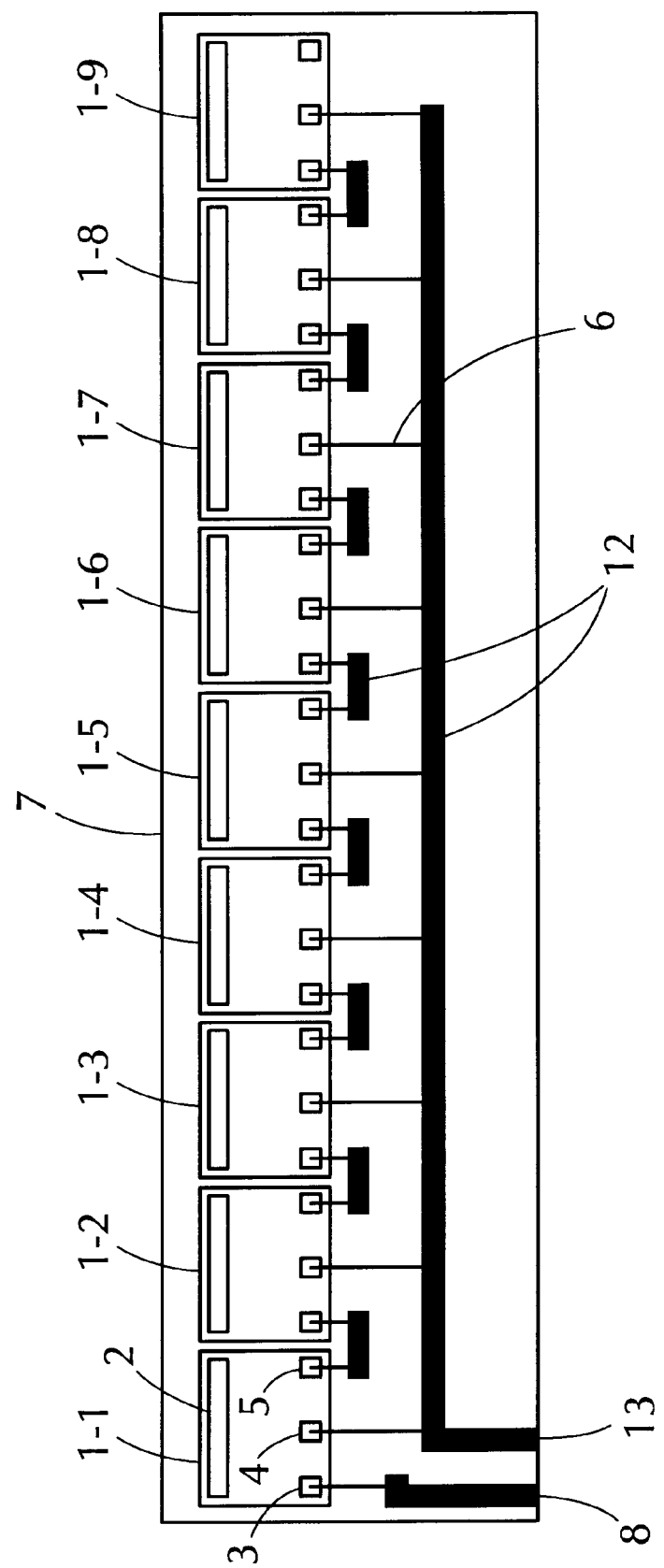
FIG. 2 is a plane view showing a monochrome image sensor used in a conventional color image reading device.
Figure 3:
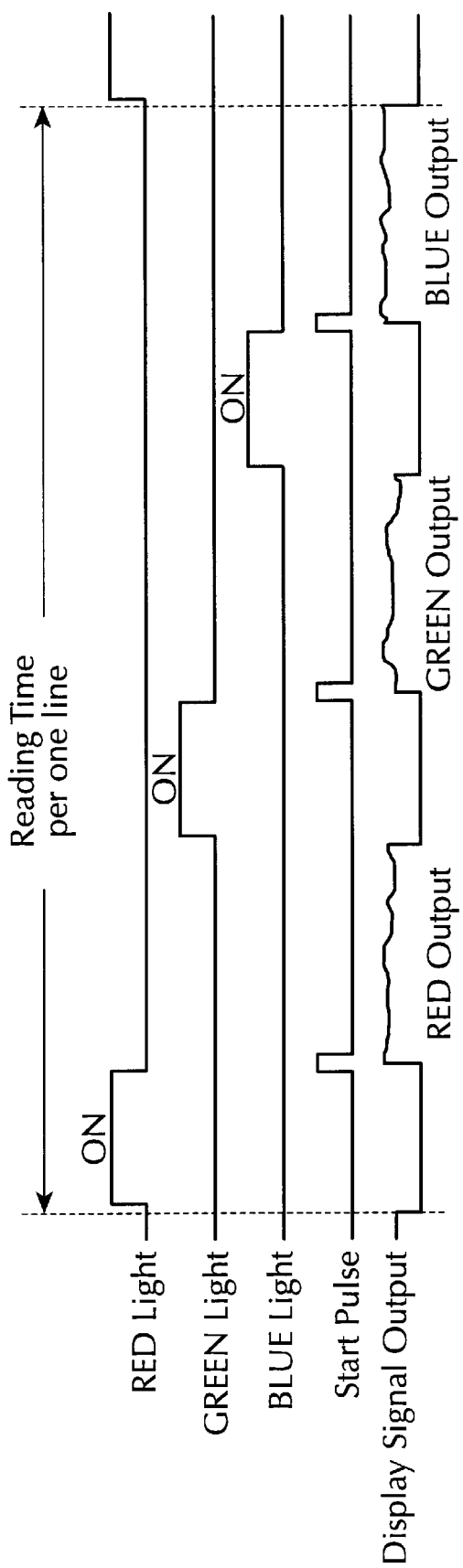
FIG. 3 is a timing chart of the conventional color image reading device.

FIG. 1 is a sectional view showing a color image reading device according to the present invention. The reflected light from the original copy 15 is entered through a SELFOC lens array 14 onto a light receiving element array of a monochrome image sensor IC 1 mounted on a circuit board 7. LEDs 17 of RED, GREEN and BLUE are mounted on a circuit board 16, so that the light from each of LEDs 17 is emitted onto the original copy. The LEDs 17 are controlled to emit the lights of respective colors in order.

Figure 4:
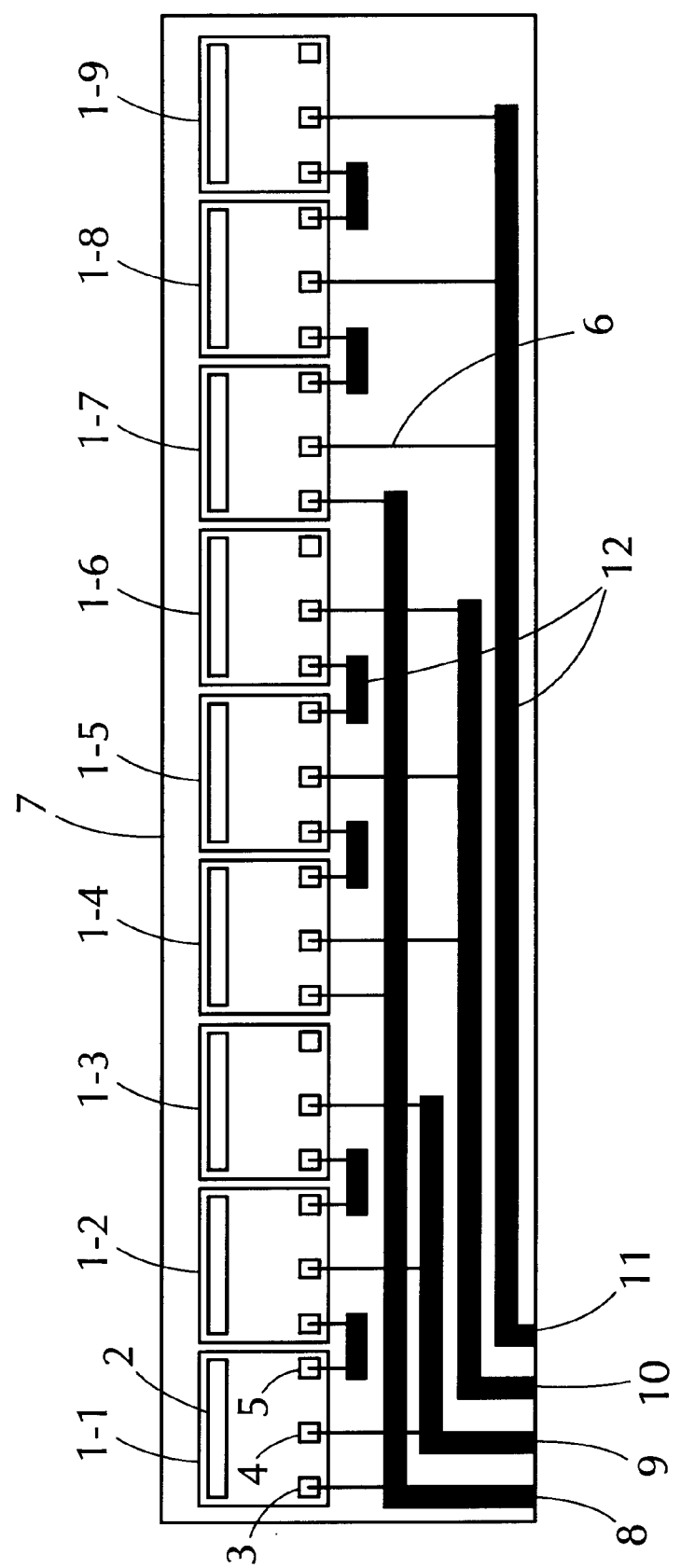
FIG. 4 is a plane view showing a monochrome image sensor used in the color image reading device according to the present invention.

FIG. 4 shows an example of a monochrome image sensor used in the color image reading device according to the present invention.

In FIG. 4, image sensor ICs 1-1 to 1-9 which have the same construction are linearly mounted on the circuit board 7. Each image sensor IC has a start signal on the circuit terminal 3, a start sensor output terminal 5, and an image signal output terminal 4, which are electrically connected to a wiring pattern 12 on the circuit board 7 through bonding wires 6. Each image sensor IC is provided with a light receiving element array 2. Although not shown in the drawings, clock pules and electric power are supplied to image sensor ICs through the bonding wires 6.

The image sensor ICs are divided into three blocks, i.e. a first block consisting of the image sensor ICs 1-1, 1-2, and 1-3, a second block consisting of the image sensor ICs 1-4, 1-5, and 1-6, and a third block consisting of the image sensor ICs 1-7, 1-8, and 1-9. In each block, the start signal in put terminal 3 of the left-end-side image sensor IC is connected to a start signal input terminal 8 of the circuit board 7. In each block, the start signal input terminals 3 of the second and more chip image sensor ICs are connected to the start signal output terminals 5 of respective one-preceding image sensor ICs.

The circuit board 7 is provided with three image signal output terminals represented by reference numerals 9, 10, and 11, respectively. The image signal output terminal 9 is connected to the image signal output terminals-4 of the image sensor ICs 1-1, 1-2, and 1-3 through bonding wires and circuit board wiring patterns. The image signal output terminal 10 is connected to the image signal output terminals 4 of the image sensor ICs 1-4, 1-5, and 1-6 through the bonding wires and circuit board wiring patterns. The image signal output terminal 11 is connected to the image signal output terminals 4 of the image sensor ICs 1-7, 1-8, and 1-9 through the bonding wires and circuit board wiring patterns.

Therefore, the image-signal-outputs from the image sensor ICs of the first, second and third blocks are output from the image signal output terminals 9, 10, and 11, respectively. The start pulse, which is input from the start pulse input terminal 8 of the circuit board 7, is entered through the start signal input terminal 3 of the image sensor IC mounted at the left end side in each block. Thus, the image signal outputs of all blocks are started simultaneously, and are also ended simultaneously after each block completes the outputs corresponding to three chips (three image sensor ICs).

Figure 5:
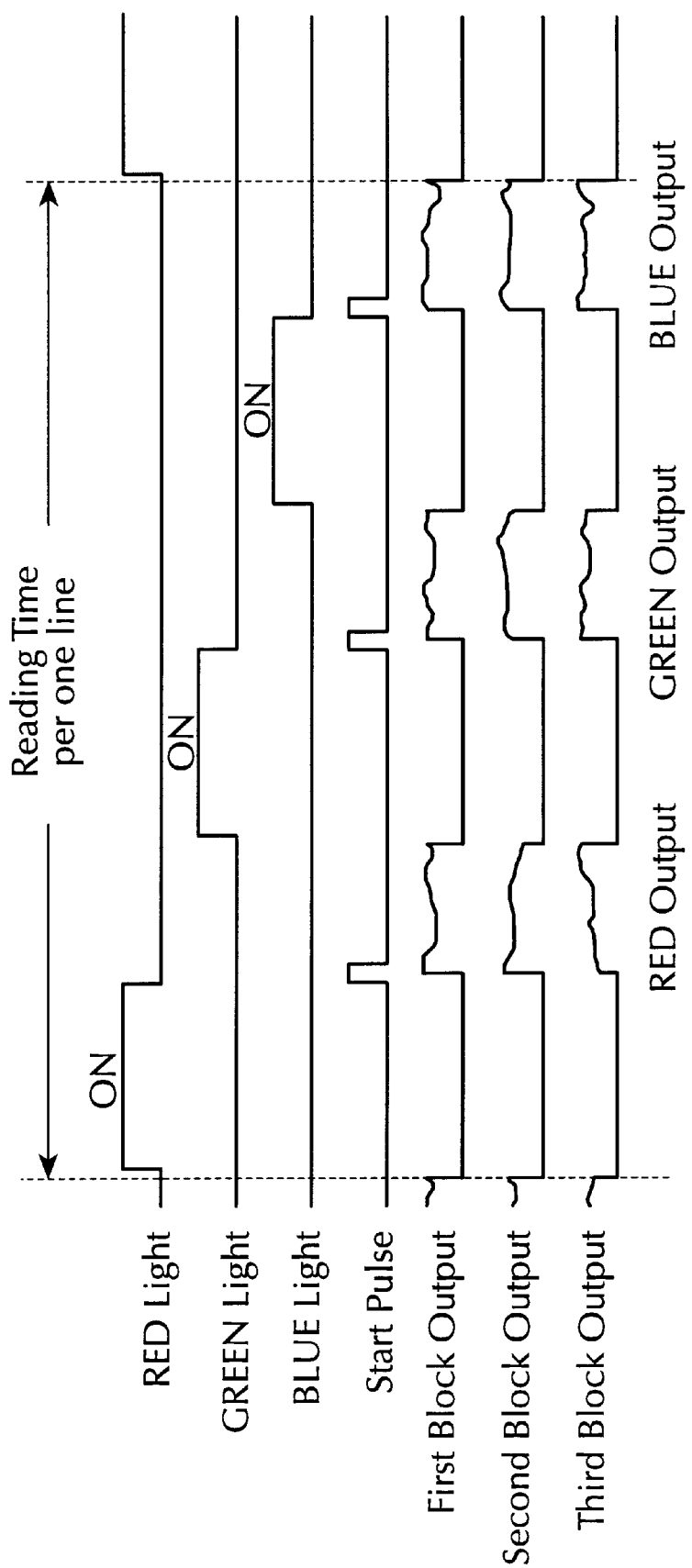
FIG. 5 is a timing chart of the color image reading device according to the present invention.

FIG. 5 shows an example of timing chart of the color image reading device according to the present invention using the image sensor shown in FIG. 4.

In FIG. 5, immediately after the RED light source is set to be OFF, the start pulse is entered through the start signal input terminal 8 of the circuit board 7 to the image sensor ICs 1-1, 1-4, and 1-7 to start the image-signal-outputs of RED component from the light receiving elements of all blocks. This output time period can be reduced to the time period required when three chips of the image sensor ICs perform the output. After the outputs of all image sensor ICs are ended, the Green light source is set to be ON, so that all light receiving elements charge carriers generated due to the reflected light from the original irradiated by GREEN light source. When the start pulses are entered through the start signal input terminal 8 of the circuit board 7 to the image sensor ICs 1-1, 1-4, and 1-7 immediately after the GREEN light source is set to be OFF, the image signal outputs of GREEN component from the light receiving elements are started. The similar procedure is carried out with respect to BLUE. Consequently, the reading time period T for one line is expressed by the following formula:

$$T=TP(R)+TP(G)+TP(B)+3\times C/N\times B\times TY$$

where the character N denotes the number of blocks, and the N is 3 (N=3) in this example.

For example, in case of an image sensor having an A4 width and 300 DPI resolution, if the number of light receiving elements is 288 (B=288), then the number of image sensor ICs is 9 (C=9), and further if the reading time period per one bit is 500 nsec (TY=500 nsec), then the image signal output time period is 1.296 msec (3×C/N×B×TY= 1.296 msec).

Assuming that each of TP(R), TP(G) and TP(B) is 1 msec (TP(R)=TP(G)=TP(B)=1 msec), the time period when light sources are ON is 3 msec (TP(R)+TP(G)+TP(B)=3 msec).

Therefore, the total reading time period T is about 4.296 msec (T=4.296 msec), so that the image signal output time period occupies 30% of the reading time period for one line. In case where the image sensor ICs are not divided into blocks (N=1), the reading time period for one line is 6.888 msec, and therefore the division into blocks can shorten the reading time period by about 2.6 msec.

In the above description, the reading time period for one line can be shortened as far as the number of blocks is 2 or more. Further, such wiring can also be applicable that the first block is constituted by the image sensor ICs 1-1, 1-4, and 1-7, the second block is constituted by the image sensor ICs 1-2, 1-5, and 1-8 and the third block is constituted by the image sensor ICs 1-3, 1-6, and 1-9 when the image sensor ICs are divided into blocks.

In the above description, the light sources maybe changed as far as the light sources provide three colors. For example, the combination of yellow, magenta and cyan is applicable. In case of LED, the half-width is narrow. Therefore, two or more kinds of LEDs that have different central wave-lengths may be combined together for one color in order to cover wide wave-length range.

As described above, the present invention can provide a color image reading device that successively switches three color light sources to irradiate the color original copy, and successively reads information on the original copy using a monochrome image sensor, and which is featured by simple construction and less reading time period.

What is claimed is:

1. A color image reading device comprising: three or more color light sources for emitting light of different colors; and an image sensor having a plurality of image sensor ICs mounted linearly thereon to form a line sensor, the image sensor ICs being divided into a plurality of blocks; wherein image signal outputs of all of the blocks are read out simultaneously when all of the light sources are OFF.

2. A color image reading device as claimed in claim 1; wherein the image sensor ICs have a plurality of light receiving elements for successively outputting data obtained by successively charging by carriers generated by photo-electric conversion.

3. A color image reading device according to claim 1; wherein the image sensor ICs each comprise an image signal output terminal for outputting an image signal, a start pulse input terminal to which a start pulse is supplied to control the outputting of the image signal from the image signal output terminal, and a start pulse output terminal for outputting the start pulse; wherein a start pulse output terminal of an anterior stage image sensor IC is connected to a start pulse input terminal of a posterior stage image sensor IC in each of the blocks, and start pulse input terminals of initial stage image sensor ICs in the respective blocks are connected together so that image signals are simultaneously output from all blocks.

4. A color image reading device according to claim 1; wherein a start signal is input to one of the image sensor ICs in each of the respective blocks, and the one image sensor IC supplies a start signal to the other image sensor ICs of the respective blocks.

5. A color image reading device comprising: a plurality of color light sources for emitting light of different colors onto an object; a lens for focusing light reflected by the object; and a monochrome image sensor having a plurality of image sensor ICs mounted linearly thereon each having an output terminal for outputting an image signal, a start pulse input terminal for inputting a start pulse to commence outputting of the image signal, and a start pulse output terminal for outputting the start pulse to another image sensor IC; wherein the image sensor ICs are divided into a plurality of image sensor blocks such that a start pulse output terminal of an anterior stage image sensor IC is connected to a start pulse input terminal of a posterior stage image sensor IC in each of the blocks and start pulse input terminals of initial stage image sensor ICs in the respective blocks are connected together and image signals are simultaneously read out from all of the blocks when all of the light sources are turned off.

6. A color image reading device according to claim 5; wherein the image sensor ICs each have a plurality of light receiving elements which charge in response to received light and which output an image signal based on photo-electric conversion.

* * * * *